US009494336B2

(12) United States Patent
Pinkalla et al.

(10) Patent No.: US 9,494,336 B2
(45) Date of Patent: Nov. 15, 2016

(54) CONFIGURABLE PLIABLE AIR DUCTS

(75) Inventors: Cary Pinkalla, Fox Point, WI (US); Frank Heim, Platteville, WI (US); Irene E. Stephan, Dubuque, IA (US); Kevin J. Gebke, Dubuque, IA (US); Michael A. Jacobson, Dubuque, IA (US); Nicholas L. Kaufmann, Sherill, IA (US); William A. Niehaus, Holy Cross, IA (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 1329 days.

(21) Appl. No.: 12/772,863

(22) Filed: May 3, 2010

(65) Prior Publication Data

US 2011/0269390 A1 Nov. 3, 2011

(51) Int. Cl.
*F24F 7/00* (2006.01)
*F16L 11/04* (2006.01)
(Continued)

(52) U.S. Cl.
CPC .............. *F24F 13/068* (2013.01); *F16L 11/02* (2013.01); *F24F 13/0209* (2013.01);
(Continued)

(58) Field of Classification Search
CPC ...... F16L 11/00; F16L 11/02; F16F 13/0245; F16F 13/0218; F16F 13/0209; F16F 13/068; F16F 13/075; F16F 13/10; F16F 2013/0608
USPC ................................ 454/903, 284, 367, 339
See application file for complete search history.

(56) References Cited

U.S. PATENT DOCUMENTS 1,211,067 A 1/1917 Braly
2,370,132 A * 2/1945 Begg ........................ B65D 7/38 220/681
(Continued)

FOREIGN PATENT DOCUMENTS

CN 201126234 Y 10/2008
DE 20010135 8/2000
(Continued)

OTHER PUBLICATIONS

Kawakami et al, JP 2007-315079 A English machine translation, Dec. 6, 2007.*
(Continued)

*Primary Examiner* — Alissa Tompkins
*Assistant Examiner* — Phillip E Decker
(74) *Attorney, Agent, or Firm* — Hanley, Flight & Zimmerman, LLC.

(57) ABSTRACT

In some example pliable air duct systems, inflatable ducts of various diameters and lengths are created by selectively assembling pre-existing stock pieces in different combinations. In some examples, the stock pieces include disconnectable longitudinal joints and disconnectable circumferential joints, wherein the longitudinal joints enable interconnecting multiple stock pieces to achieve a desired tube diameter, and the circumferential joints allow connecting multiple tube segments end-to-end to produce an air duct assembly of a desired length. To control the volume and/or the direction of air discharged from the duct, the duct assembly, in some examples, includes an adjustable register comprising a movable pliable sheet that overlies a discharge opening in a pliable sidewall of the duct. In some examples, the inflatable duct includes one or more cutout patterns on the duct's sidewall to provide guidance in creating a sidewall discharge opening of a proper size and location.

15 Claims, 13 Drawing Sheets

(51) Int. Cl.

| | |
|---|---|
| ***F24F 13/068*** | (2006.01) |
| ***F16L 11/02*** | (2006.01) |
| ***F24F 13/02*** | (2006.01) |
| ***F24F 13/075*** | (2006.01) |
| ***F24F 13/10*** | (2006.01) |
| *F24F 13/06* | (2006.01) |

(52) U.S. Cl.

CPC ...... *F24F 13/0218* (2013.01); *F24F 13/0245* (2013.01); *F24F 13/075* (2013.01); *F24F 13/10* (2013.01); *F24F 2013/0608* (2013.01); *Y10T 29/49826* (2015.01)

(56) References Cited

U.S. PATENT DOCUMENTS

| | | | | |
|---|---|---|---|---|
| 2,417,636 | A * | 3/1947 | Ditzler | F02N 19/10 123/142.5 R |
| 2,595,408 | A * | 5/1952 | Quest | 405/40 |
| 2,839,080 | A | 6/1958 | Copeland | |
| 3,443,671 | A * | 5/1969 | Dyke | A45C 7/0027 190/103 |
| 3,659,515 | A | 5/1972 | Galaniuk | |
| 3,699,872 | A | 10/1972 | Kruger | |
| 3,705,736 | A | 12/1972 | Dawson | |
| 4,337,791 | A | 7/1982 | Tech et al. | |
| 4,342,327 | A * | 8/1982 | Ueng | E04H 15/52 135/124 |
| 4,558,526 | A * | 12/1985 | Baus | 454/284 |
| 4,791,236 | A * | 12/1988 | Klein | D04B 1/14 138/166 |
| 4,796,803 | A * | 1/1989 | Kelley | 236/49.4 |
| 5,067,217 | A * | 11/1991 | Maguire | B41N 7/00 492/48 |
| 5,111,739 | A * | 5/1992 | Hall | 454/903 |
| 5,655,963 | A | 8/1997 | Paschke et al. | |
| 5,697,590 | A * | 12/1997 | Hull | E04F 10/02 248/225.11 |
| 5,769,708 | A * | 6/1998 | Paschke | 454/306 |
| 5,782,290 | A * | 7/1998 | Cook | 454/286 |
| 5,948,509 | A * | 9/1999 | Felson | 138/172 |
| 6,280,320 | B1 * | 8/2001 | Paschke et al. | 454/298 |
| 6,286,876 | B1 * | 9/2001 | Jasperse | F24F 13/0218 138/156 |
| 6,558,250 | B1 * | 5/2003 | Paschke | 454/306 |
| 6,899,615 | B2 * | 5/2005 | Gebke | 454/306 |
| 8,155,778 | B1 | 4/2012 | Barcock | |
| 8,434,526 | B1 * | 5/2013 | Pinkalla et al. | 138/107 |
| 8,676,545 | B2 * | 3/2014 | Kaufmann et al. | 454/284 |
| 8,808,075 | B2 * | 8/2014 | Gebke et al. | 454/297 |
| 8,844,578 | B2 * | 9/2014 | Pinkalla et al. | 138/107 |
| 9,152,191 | B1 * | 10/2015 | Gardner | F24F 13/0218 |
| 2003/0022617 | A1 * | 1/2003 | Gebke et al. | 454/306 |
| 2003/0028175 | A1 | 2/2003 | D'Antonio | |
| 2003/0194965 | A1 | 10/2003 | Paschke et al. | |
| 2004/0229559 | A1 | 11/2004 | Gebke et al. | |
| 2006/0252365 | A1 | 11/2006 | Gebke | |
| 2008/0035903 | A1 * | 2/2008 | Newton | A63G 31/12 256/1 |
| 2008/0113610 | A1 | 5/2008 | Brown et al. | |
| 2008/0176506 | A1 | 7/2008 | Gebke et al. | |
| 2009/0221226 | A1 * | 9/2009 | Gebke et al. | 454/297 |
| 2009/0227194 | A1 | 9/2009 | Johnston | |
| 2010/0048121 | A1 * | 2/2010 | Klopfenstein et al. | 454/186 |
| 2010/0194105 | A1 * | 8/2010 | Paquet et al. | 454/284 |
| 2011/0073425 | A1 * | 3/2011 | Siu | A45C 7/0077 190/101 |
| 2011/0269390 | A1 | 11/2011 | Pinkalla et al. | |
| 2012/0010752 | A1 * | 1/2012 | Kaufmann et al. | 700/276 |
| 2012/0125472 | A1 * | 5/2012 | Pinkalla et al. | 138/96 R |
| 2014/0000744 | A1 * | 1/2014 | Pinkalla et al. | 138/103 |
| 2014/0007971 | A1 * | 1/2014 | Pinkalla et al. | 138/172 |
| 2014/0261835 | A1 * | 9/2014 | Pinkalla et al. | 138/107 |

FOREIGN PATENT DOCUMENTS

| | | | | |
|---|---|---|---|---|
| EP | 0741211 | A1 * | 11/1996 | |
| GB | 1287046 | | 8/1972 | |
| JP | 2007315079 | | 12/2007 | |
| WO | WO 9515460 | A1 * | 6/1995 | E03F 3/06 |
| WO | 2006119399 | | 11/2006 | |

OTHER PUBLICATIONS

International Searching Authority, "Written Opinion," issued in connection with International Patent Application No. PCT/US2011/030747, mailed on Nov. 24, 2011, 10 pages.

International Searching Authority, "Search Report," issued in connection with International Patent Application No. PCT/US2011/030747, mailed on Nov. 24, 2011, 6 pages.

International Bureau, "International Preliminary Report on Patentability," issued in connection with International Patent Application No. PCT/US2011/030747, mailed on Nov. 15, 2012 (11 pages).

USPTO, "Office Action," issued in connection with U.S. Appl. No. 12/834,703, mailed on Jan. 18, 2013 (9 pages).

Bores—USA Industries, "Flow Measurement," available at http://web.archive.org/web/20081228083316/http://www.usaindustries.com/flowmeasurement_bore.htm, Dec. 28, 2008 (2 pages).

International Searching Authority, "International Search Report", issued in connection with international application serial No. PCT/US2011/043542, mailed on Oct. 18, 2011, 3 pages.

International Searching Authority, "Written Opinion", issued in connection with the international application serial No. PCT/US2011043542, mailed on Oct. 18, 2011, 7 pages.

IP Australia, "Examination Report," issued in connection with Australian Patent Application No. 2011248926, dated Apr. 22, 2013 (2 pages).

International Searching Authority, "Invitation to Pay Additional Fees and Partial Search Report," issued in connection with international application serial No. PCT/US2011/030747, mailed Jul. 11, 2011, 7 pages.

USPTO, "Office Action," issued in connection with U.S. Appl. No. 12/834,703, dated May 23, 2013 (16 pages).

USPTO, "Office Action," issued in connection with U.S. Appl. No. 12/834,703, dated Aug. 1, 2013 (21 pages).

United States Patent and Trademark Office, "Office Action," issued in connection with U.S. Appl. No. 12/834,703 on Jan. 3, 2014, 15 pages.

Zulovich, J. et al., "Fans: Airflow versus Static Pressure", Housing of the Future, 2008, pp. 3.

Australian Intellectual Property Office "Notice of Acceptance," issued in connection with the Australian Patent Application Serial No. 2011248926, mailed on Apr. 3, 2014, 3 pages.

Canadian Intellectual Property Office, "Office Action", issued in connection with Canadian patent application No. 2,797,460, mailed on May 23, 2014, 4 pages.

United States Patent and Trademark Office, "Notice of Allowance and Fee(s) Due," issued in connection with the U.S. Appl. No. 12/834,703, mailed on Apr. 3, 2014, 18 pages.

The State Intellectual Property Office of China, "First Notification of Office action", issued in connection with Chinese patent application No. 201180027600.1, issued on Aug. 29, 2014, 9 pages.

The State Intellectual Property Office of China, "Search Report", issued in connection with Chinese patent application No. 201180027600.1, issued on Aug. 22, 2014, 2 pages.

Australian Intellectual Property Office, "Certificate of Grant", issued in connection with Australian patent No. 2011248926, Jul. 31, 2014, 1 page.

Canadian Intellectual Property Office, "Office Action," issued in connection with Application No. 2,797,460, Feb. 24, 2015, 3 pages.

IP Australia, "Patent Examination Report No. 1", issued in connection with Australian Patent No. 2014203662, issued on Jul. 14, 2015, 3 pages.

(56) References Cited

OTHER PUBLICATIONS

The State Intellectual Property Office of China, "Second Office action", issued in connection with Chinese patent application No. 201180027600.1, mailed on May 13, 2015, 17 pages.
Australian Patent Office, "Notice of Acceptance", issued in connection with Australian patent application No. 2014203662, Feb. 20, 2016, 3 pages.
Canadian Patent Office ,"Notice of Allowance", issued in connection with Canadian patent application No. 2,797,460, Jan. 5, 2016, 1 page.
The State Intellectual Property Office of China, "The Third Notification of Office action", issued in connection with Chinese patent application No. 201180027600.1, Nov. 13, 2015, 17 pages.
State Intellectual Property Office of China, "Notice of Completion of Formalities for Patent Registration", issued in connection with Chinese patent application No. 201180027600.1, Mar. 22, 2016, 5 pages.
Australia Patent Office, Certificate of Grant, issued in connection with Australian patent application No. 2014203662, Jun. 16, 2016, 1 page.

* cited by examiner

CONFIGURABLE PLIABLE AIR DUCTS

FIELD OF THE DISCLOSURE

This patent generally pertains to pliable inflatable air ducts and, more specifically, to features that enable such ducts to be selectively set up in various configurations.

BACKGROUND

Sheet metal ductwork is often used for conveying conditioned air to a comfort zone, such as a room or other area(s) of a building. Metal ducts, however, can be expensive, unsightly, and susceptible to condensation. Consequently, inflatable air ducts, such as those made of pliable fabric, are often preferred over conventional sheet metal air ducts.

Inflatable air ducts typically include an inflatable tube made of fabric or otherwise pliable material and are used for conveying conditioned air to comfort zones. A blower at the inlet of the duct is selectively activated to supply conditioned air as needed. The air discharged from the blower inflates the duct to create a radially expanded tubular conduit that conveys the air along the length of the inflated tube. The pliable wall of the tube may be porous and/or may be perforated along a length of the tube for evenly or strategically dispersing air from within the duct into the areas being conditioned or ventilated.

Inflatable air ducts are often suspended from a horizontal cable or track mounted just below the ceiling of a building. In other examples, inflatable ducts are installed beneath a floor and supply conditioned air to a comfort zone by releasing the air up through one or more openings in the floor.

DETAILED DESCRIPTION

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

Figure 1:
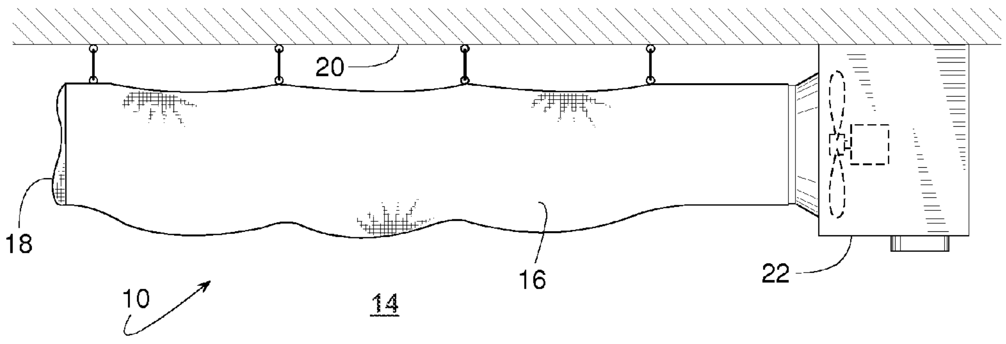
FIG. 1 is a side view of on example inflatable air duct assembly, wherein the duct is shown deflated.
Figure 2:
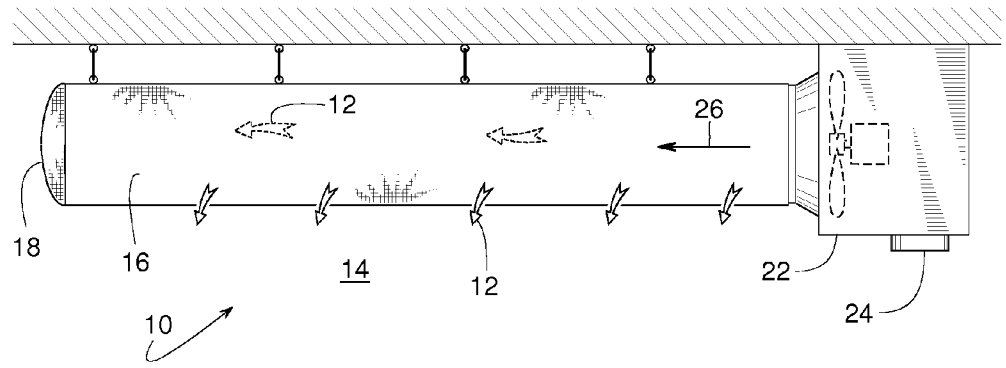
FIG. 2 is a side view of the air duct of FIG. 1 but showing the duct inflated.

FIGS. 1 and 2 show an example inflatable air duct or duct 10 set up for delivering air 12 to a comfort zone 14 or other area(s) of a building. In this example, duct 10 includes a pliable tubular sidewall or sidewall 16 with an end cap 18. While the duct 10 may be installed in numerous configurations and/or arrangements, in this example, duct 10 is suspended from an overhead support 20 (e.g., ceiling, rafter, beam, cable, etc.). An air supply, such as a blower 22, draws in air from an inlet 24 and discharges air 12 through the interior of duct 10, thereby inflating duct 10. The terms, "inflate," "inflating," "inflated," and "inflatable," as used herein, mean that upon pressurizing the interior of a duct, the duct 10 expands noticeably with the internal volume of the duct 10 increasing appreciably. This is the case even though some example inflatable ducts include structure that helps hold the duct in a partially expanded shape when the blower 22 is de-energized. FIG. 1 shows blower 22 de-energized with duct 10 deflated, and FIG. 2 shows blower 22 energized with duct 10 inflated.

When duct 10 is inflated, air 12 discharged from blower 22 flows longitudinally (in a direction generally indicated by arrow 26) through duct 10. Various examples of duct 10 releases air 12 from within duct 10 to comfort zone 14 via porosity and/or discrete openings in sidewall 16. Sidewall 16 may be made of one or more similar or different materials. For example, sidewall 16 may include and/or be made of materials including, but not limited to, urethane coated polyester fabric, uncoated polyester fabric, porous fabric, nonporous pliable sheet material, perforated pliable sheet material, and/or various combinations thereof.

Figure 3:
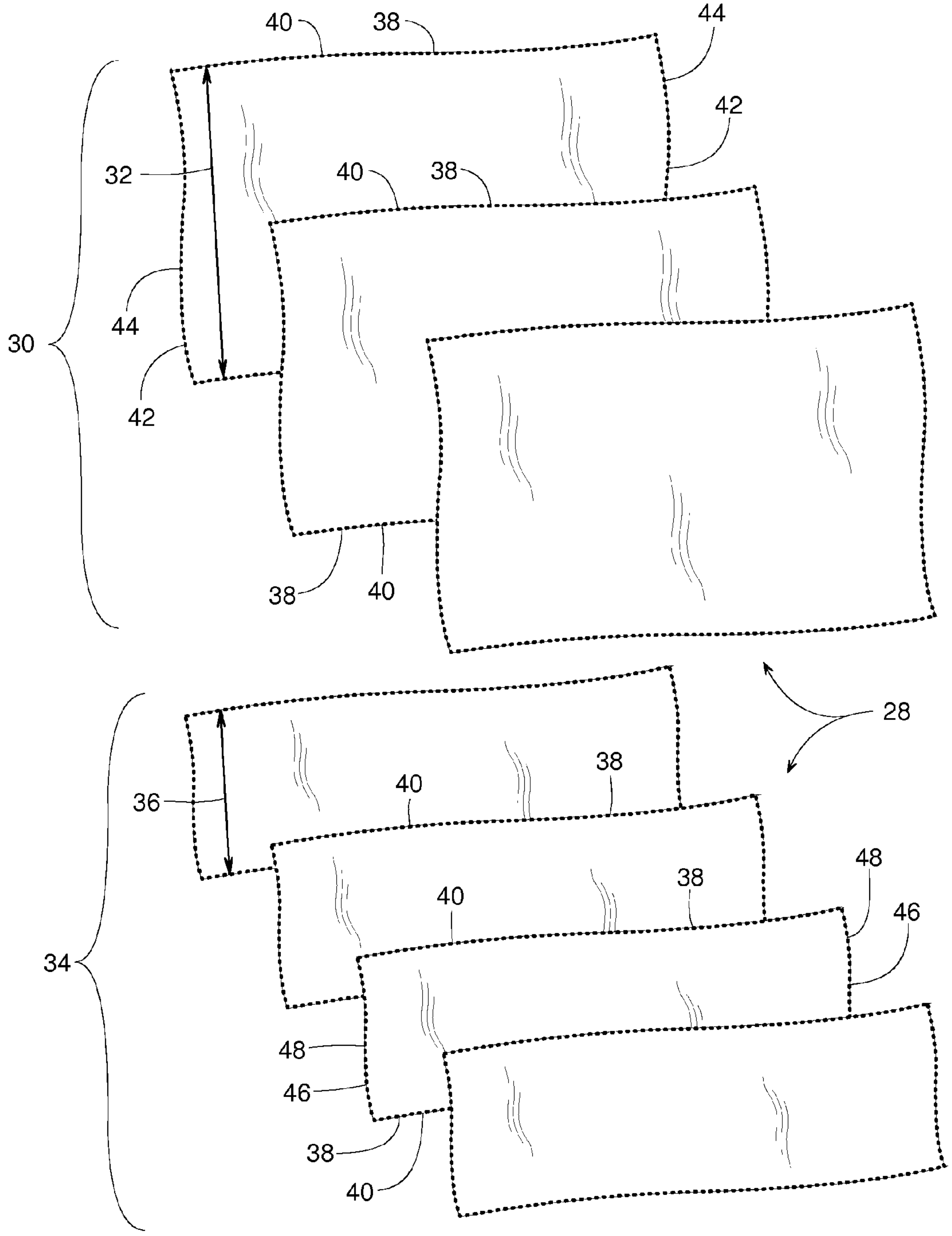
FIG. 3 is a front view of an example inventory of example stock sidewall pieces.

FIGS. 3-7 illustrate a method for creating inflatable air ducts (e.g., the air duct 10) for different installations without having to custom make unique pieces for each system. FIG. 3, for example, shows an inventory of a plurality of pliable sidewall pieces 28 including relatively large pieces 30 (e.g., larger circumferential length 32) and smaller pieces 34 (e.g., smaller circumferential length 36). In other examples, the inventories may have any number of sizes (e.g., 1, 2, 3, etc.) and/or shapes (square, rectangular, etc.) and some example inventories have only single-size pieces. In any case, the inventory of pieces can be assembled in different ways to create an assortment of inflatable duct tubes of various diameters and lengths For the example illustrated in FIG. 3, each piece 30 and 34 includes longitudinal edges 38 with disconnectable longitudinal joints 40 that may be interconnected to combine one or more pieces 30 and/or 34 to provide different tube diameters (e.g., a first diameter, a second diameter, a third diameter, etc.). Large pieces 30 have axial edges 42 with disconnectable circumferential joints 44, and smaller pieces 34 have axial edges 46 with disconnectable circumferential joints 48. Circumferential joints 44 and 48 may be interconnected to combine one or more pieces 30 and/or 34 to provide different tube lengths (e.g., a first length, a second length, a third length, etc.). The expression, "disconnectable joint," means a connection that can be repeatedly connected and separated multiple times without appreciable damage to the adjoining pieces over its expected useful life. Examples of joints 40, 44 and 48 include, but are not limited to, zippers, touch-and-hold fasteners (e.g., VELCRO, a registered trademark of Velcro Industries B.V.), bead-in-groove fasteners (e.g., ZIPLOC, a registered trademark of S.C. Johnson & Son, Inc.), series of hooks, series of buttons, series of snaps, laces, etc.

Figure 4:
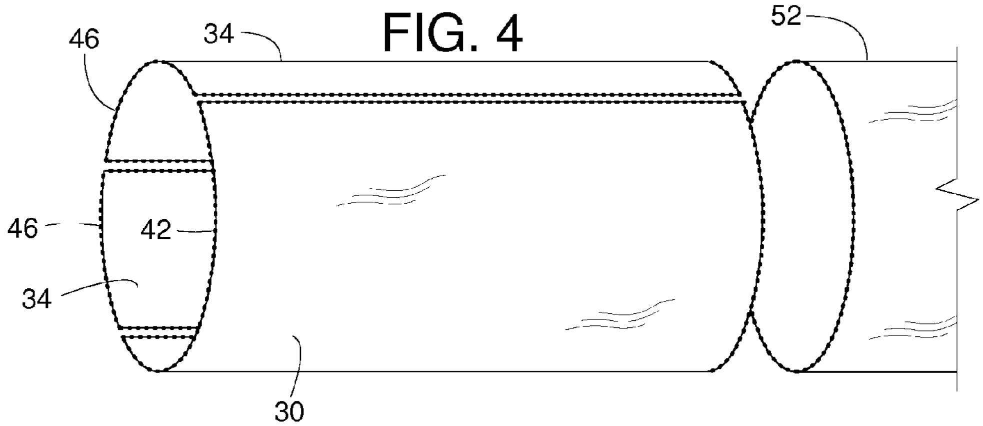
FIG. 4 is a perspective view of example sidewall pieces about to be assembled.
Figure 5:
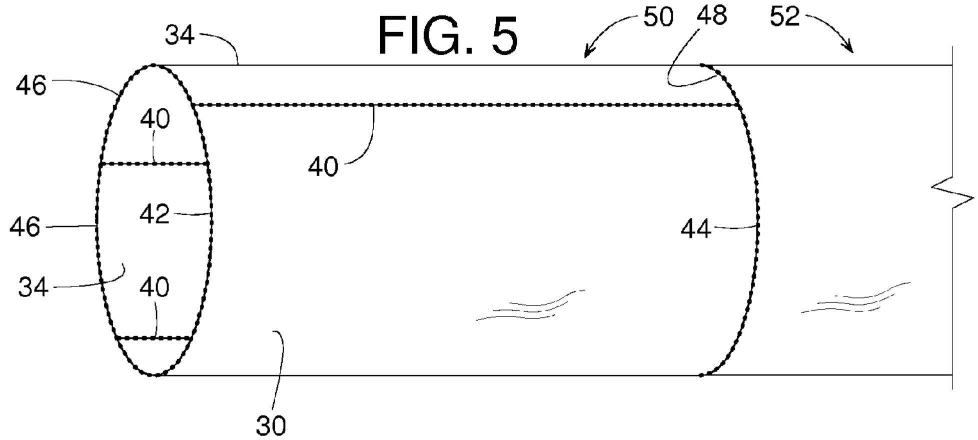
FIG. 5 is a perspective view similar to FIG. 4 but showing the pieces assembled.
Figure 6:
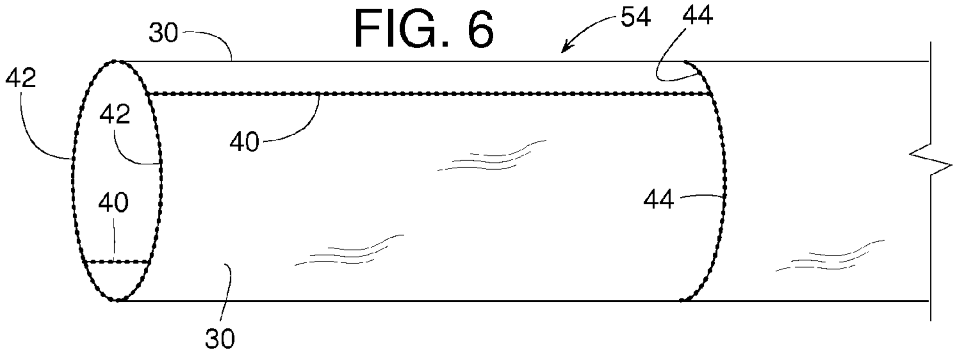
FIG. 6 is a perspective view similar to FIG. 5 but showing another example of an assembled air duct assembly.
Figure 7:
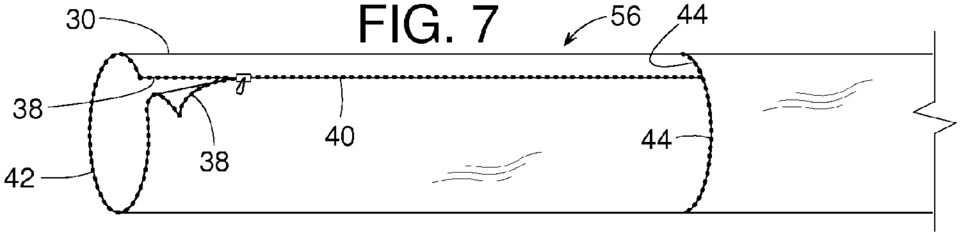
FIG. 7 is a perspective view similar to FIGS. 5 and 6 but showing yet another example of an assembled air duct assembly.

FIG. 4 shows one of the large pieces (e.g., a sidewall piece) 30 about to be connected to two smaller pieces (e.g., side wall pieces) 34 and the resulting assembled tube segment 50 about to be connected to the axial end of another tube segment 52. FIG. 5 shows the pieces 30 and 34 of FIG. 4 in their assembled configuration as tube segments 50 and 52. FIG. 6 shows two large pieces (e.g., sidewall pieces) 30 interconnected to provide a tube segment 54 with a diameter that is relatively smaller than the tube formed by pieces 30 and 34 of FIG. 5. FIG. 7 shows a single large piece (e.g., a single sidewall piece) 30 with its longitudinal edges 38 connected at a disconnectable joint 40 to provide an even smaller diameter tube segment 56. In examples where a tube is not perfectly cylindrical, the term, "diameter," refers to the effective diameter of the tube, which is defined herein as $(4A/3.14)^{0.5}$, wherein "A" is the cross-sectional area of the air passageway of the tube.

The example tube assemblies in FIGS. 5-7 are shown having a common sidewall piece (e.g., sidewall piece 30) to illustrate the universal application of the pieces as opposed to having to custom make each one. It should be noted that the inventory of pieces shown in FIG. 3 illustrates an example of providing a plurality of sidewall pieces. FIGS. 5-7 illustrate examples of suggesting a plurality of different design arrangements in which at least some of the plurality of sidewall pieces can be interconnected circumferentially to create an assortment of inflatable tubes of various diameters. The plurality of different design arrangements includes a larger diameter tube design (FIG. 5) that employs the common sidewall piece, and the plurality of different design arrangements includes a smaller diameter tube design (FIG. 6 or 7) that employs the common sidewall piece. A comparison of FIGS. 4 and 5 illustrates an example of assembling a chosen set of sidewall pieces from the plurality of sidewall pieces to create a certain inflatable tube (e.g., a tube having a particular diameter and/or flow characteristics).

Figure 8:
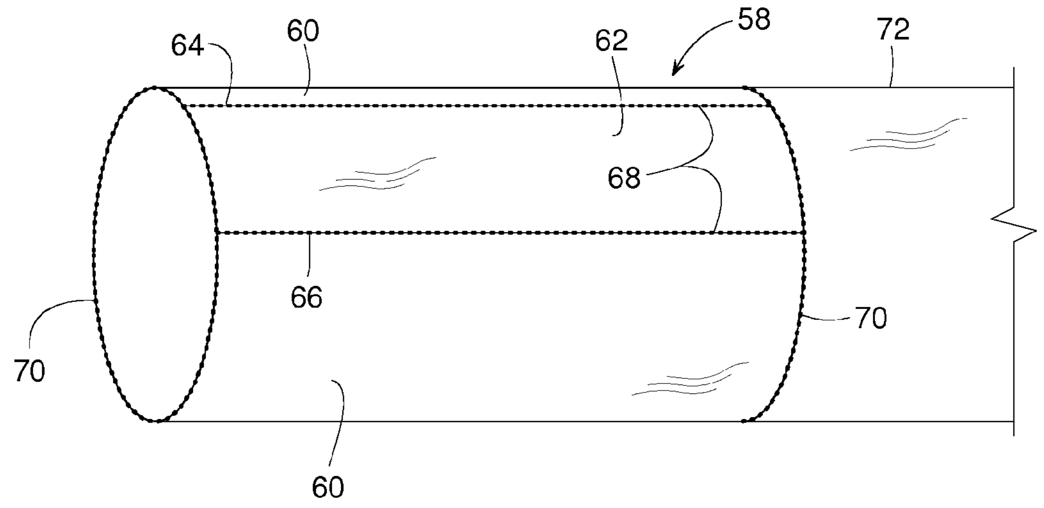
FIG. 8 is a perspective view of another example air duct assembly.
Figure 9:
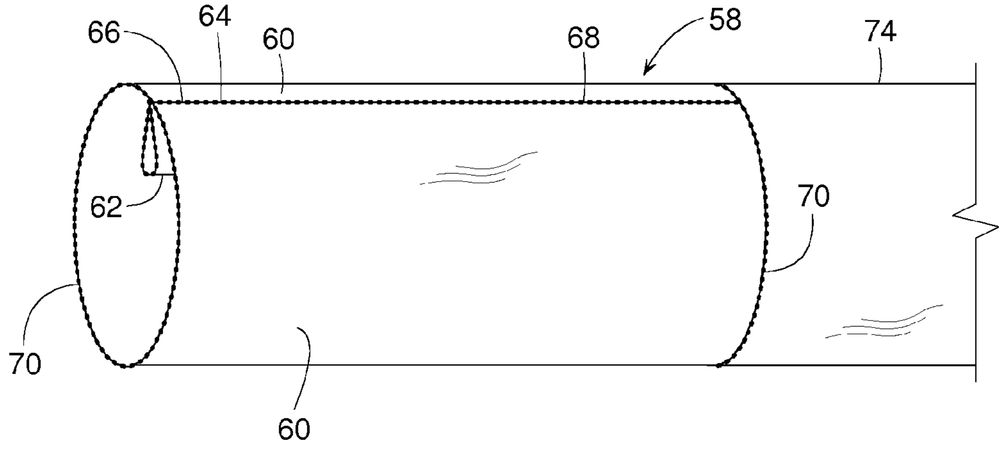
FIG. 9 is a perspective view similar to FIG. 8 but showing the duct in a smaller diameter configuration.

FIGS. 8 and 9 show an example inflatable air duct or duct 58 that can be selectively configured to a larger diameter configuration (FIG. 8) or a smaller diameter configuration (FIG. 9). The larger diameter configuration provides an expanded cross-sectional flow area, and the smaller diameter configuration provides a reduced cross-sectional flow area.

In this example, duct 58 includes a first pliable sidewall section 60 and a second pliable sidewall section 62. The two sections 60 and 62 are divided by a first longitudinal border 64 and a second longitudinal border 66. Duct 58 includes a disconnectable longitudinal joint 68 extending along borders 64 and 66. Examples of joint 68 include, but are not limited to, zippers, touch-and-hold fasteners (e.g., VELCRO), bead-in-groove fasteners (e.g., ZIPLOC), series of hooks, series of buttons, series of snaps, laces, etc. Disconnecting joint 68 to separate borders 64 and 66 places duct 58 in the larger diameter configuration, as shown in FIG. 8. Closing or connecting joint 68 brings borders 64 and 66 together and positions second sidewall 62 within the reduced cross-sectional flow area of duct 58, which places duct 58 in the smaller diameter configuration, as shown in FIG. 9. In either configuration, a circumferential joint 70 can connect duct 58 to the end of another appropriately sized tube segment, such as segment 72 or 74, for example.

Figure 10:
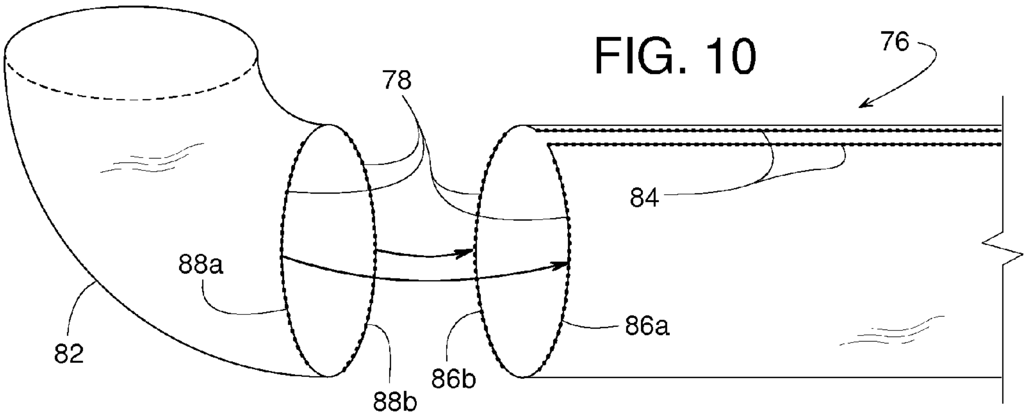
FIG. 10 is an exploded view showing an example air duct assembly with a configurable elbow.
Figure 11:
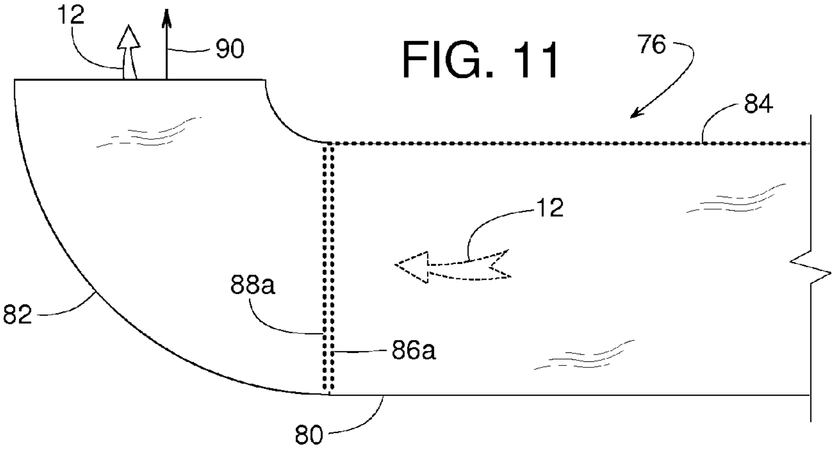
FIG. 11 is a perspective view of the duct of FIG. 10 but showing the duct assembled in an example configuration.
Figure 12:
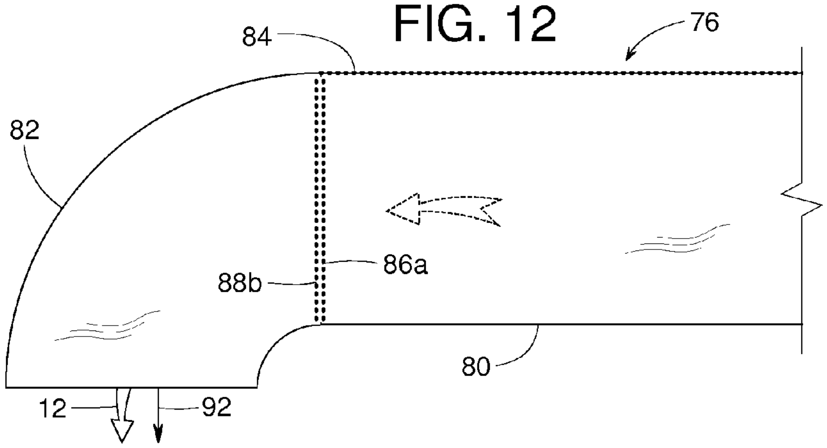
FIG. 12 is a perspective view of the duct of FIG. 10 but showing the duct assembled in another example configuration.

FIGS. 10, 11 and 12 show an example inflatable air duct assembly or duct assembly 76 that can be selectively configured to direct airflow in different directions. In this example, duct assembly 76 includes a disconnectable circumferential joint 78 that connects a pliable tube 80 to a pliable elbow 82 in multiple configurations. A longitudinal joint 84 connects the longitudinal edges of tube 80. Examples of joints 78 and 84 include, but are not limited to, zippers, touch-and-hold fasteners (e.g., VELCRO), bead-in-groove fasteners (e.g., ZIPLOC), series of hooks, series of buttons, series of snaps, laces, etc.

In the illustrated example, circumferential joint 78 includes a first tube joint segment **86*a* on tube 80, a second tube joint segment 86*b* on tube 80, a first elbow joint segment 88*a* on elbow 82, and a second elbow joint segment 88*b* on elbow 82. First tube joint segment 86*a* is selectively connectable to elbow joint segments 88a and 88b. Likewise, second tube joint segment 86b is selectively connectable to elbow joint segments 88a and 88**b.

When first tube joint segment 86a and second tube joint segment 86b are connected respectively to first elbow joint segment 88a and second elbow joint segment 88b, as shown in FIG. 11, the inflatable air duct assembly 76 is in the first direction configuration to direct air 12 in a first direction 90. When first tube joint segment 86a and second tube joint segment 86b are connected respectively to second elbow joint segment 88b and first elbow joint segment 88a, as shown in FIG. 12, duct assembly 76 is in the second direction configuration to direct air 12 in a second direction 92. In some examples, directions 90 and 92 are in opposite directions, 180-degrees apart, which can be achieved by having joint segments 86a, 86b, 88a and 88b be of substantially equal circumferential length with longitudinal joint 84 being positioned circumferentially between tube joint segments 86a and 86b. However, the directions 90 and 92 may be arranged at any suitable angle relative to one another (e.g., 45-degrees apart, 90-degrees apart, etc.) and, accordingly, any number (e.g., 1, 2, 3, etc.) of joint segments 86 and 88 may be provided.

Figure 13:
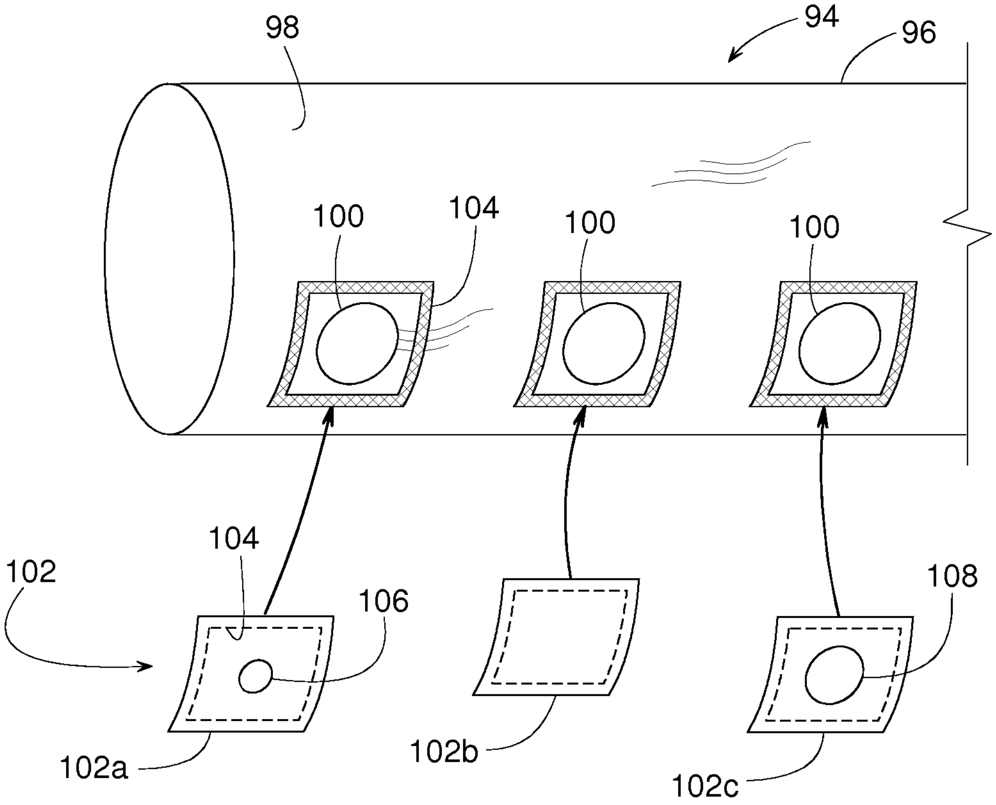
FIG. 13 is a perspective view of an example duct assembly with example removable pliable sheets about to be installed over discharge openings in the duct.
Figure 14:
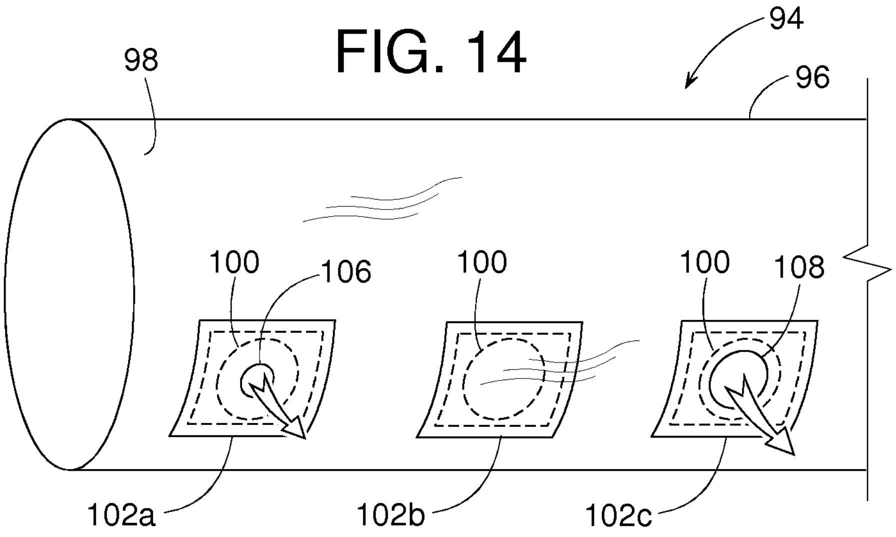
FIG. 14 is a perspective view similar to FIG. 13 but showing the pliable sheets installed.

FIGS. 13 and 14 show an example inflatable air duct assembly 94 that can be selectively configured to establish the volume of airflow discharged at various locations along the length of duct assembly 94. In this example, duct assembly 94 includes an inflatable tube 96 with a pliable sidewall 98 that includes a plurality of discharge openings 100. The discharge openings 100 may be similarly or differently sized. To restrict the airflow discharged through openings 100, a pliable sheet or patch 102 is placed over one or more openings 100. The example sheets 102 may define an opening though which air may flow that may be differently sized than opening 100. Alternatively, sheets 102 may not define an opening. The openings of sheet 102 may be similarly or differently sized (e.g., a first size, a second size, etc.) and/or shaped (e.g., a first shape, a second shape, etc.). Any suitable fastener 104 (e.g., touch-and-hold fastener) can be used to help hold sheet 102 to sidewall 98. In other examples, sheet 102 may additionally or alternatively be secured to sidewall 98 using an adhesive or glue. In the illustrated examples, a sheet 102a has a relatively small opening 106 for greatly restricting the airflow through opening 100 when sheet 102a is moved from its more-open position (FIG. 13) to its obstructed position (FIG. 14). A sheet 102b has no opening, so sheet 102b completely blocks airflow through opening 100 when sheet 102b is moved from its more-open position (FIG. 13) to its obstructed position (FIG. 14) (e.g., when sheet 102b is affixed to sidewall 98 via fastener 104). A sheet 102c has a moderately sized opening 108 for providing some flow resistance through opening 100 when sheet 102c is moved from its more-open position (FIG. 13) to its obstructed position (FIG. 14).

Figure 15:
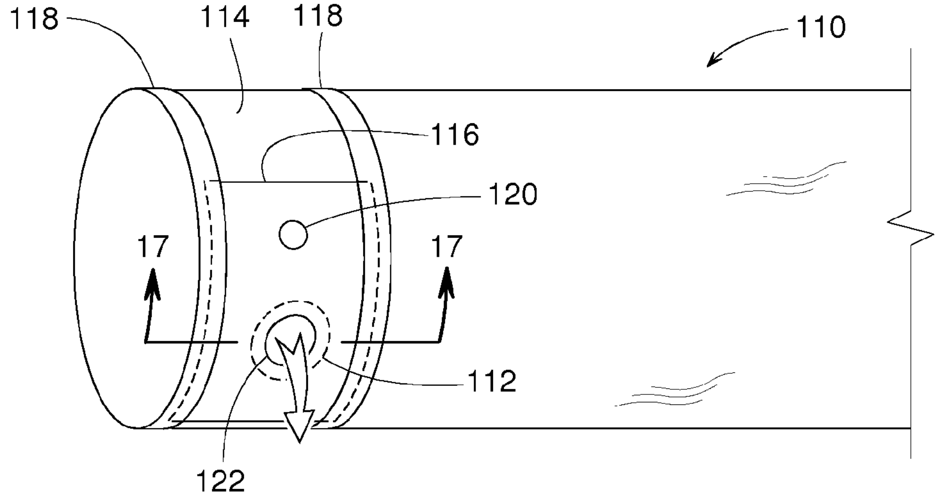
FIG. 15 is a perspective view of another example duct assembly with a circumferentially movable sheet for adjusting the airflow through a discharge opening in the duct.
Figure 16:
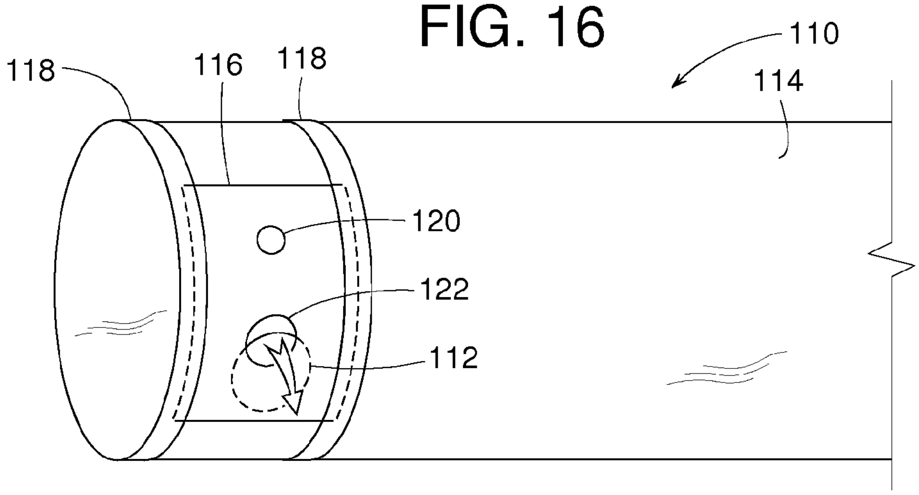
FIG. 16 is a perspective view similar to FIG. 15 but showing the example movable sheet in another position.
Figure 17:
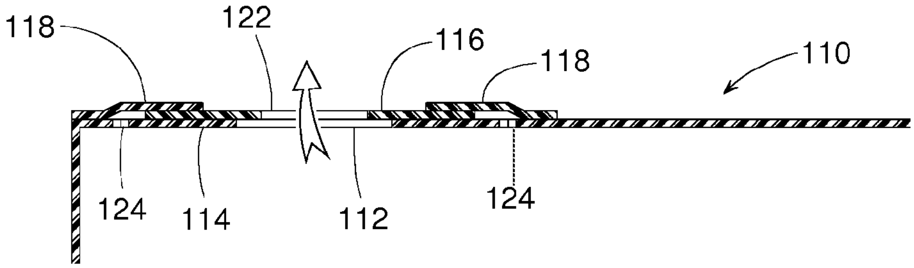
FIG. 17 is a cross-sectional view taken along line 17-17 of FIG. 15.

FIGS. 15, 16 and 17 show an example inflatable air duct assembly 110 that can be selectively configured to establish or change the volume of airflow discharged through an opening 112 in a pliable sidewall 114 of duct assembly 110. The duct assembly 110 may include one or more pliable pieces that are coupled together. To restrict the airflow discharged through opening 112, a pliable sheet 116 is attached to sidewall 114 such that sheet 116 can be moved circumferentially around duct assembly 110 to adjust the extent to which sheet 116 covers opening 112. In some examples, the sheet 116 may be additionally secured relative to the sidewall 114 with a fastener such as a touch-and-hold fastener. FIG. 15 shows sheet 116 in a more-open position, and FIG. 16 shows sheet 116 is an obstructed position. In the illustrated example, duct assembly 110 includes a pair of axially spaced-apart circumferential lips, or fasteners 118 that at least partially holds sheet 116 against sidewall 114. For example, opposing portions of sheet 116 may be at least partially positioned within a groove, channel or slot defined by the lips 118 and the sidewall 114 (e.g., similar to a tongue-and-groove) such that the interaction between sheet 116 and lips 118 and sidewall 114 holds sheet 116 relatively securely against sidewall 114 while enabling sheet 116 to be moveable (e.g., circumferentially moveable) relative to sidewall 114. Lips 118 may be made of a similar or different material as sidewall 114 and/or sheet 116. For example, lips 118 may be made at least partially of a relatively rigid material to ensure that sheet 116 maintains its position adjacent to sidewall 114. In some examples, lips 118 may have a similar or different thickness as sidewall 114 and/or sheet 116. In some examples, edges of sheet 116 may be made of a different material than the remainder of sheet 116 and/or include an insert(s) adjacent to the edges to increase the rigidity of edges and substantially ensure that sheet 116 maintains its position adjacent to sidewall 114 and lip 118. In some examples, lips 118 can be coupled to sidewall 114 by sewing, glue or adhesive, touch-and-hold fasteners, etc.

To control the volume of airflow, in this example, sheet 116 includes a relatively small opening 120 and a moderately-sized opening 122, either of which can be move in or out of registry with opening 112 in sidewall 114, thereby determining the flow restriction therethrough. In some examples, lips 118 also provide a cover for circumferential joints 124 (e.g., a zipper).

Figure 18:
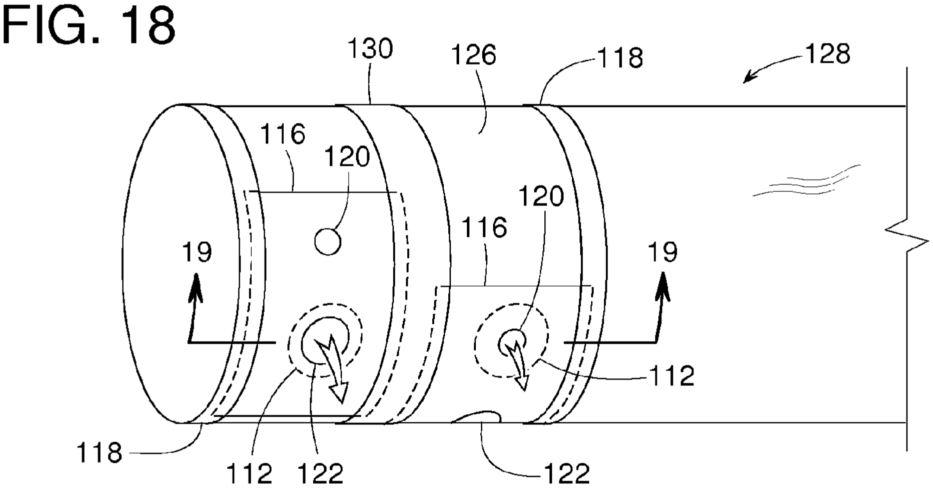
FIG. 18 is a perspective view of another example duct assembly with two circumferentially movable sheets for adjusting the airflow through two discharge openings in the duct.
Figure 19:
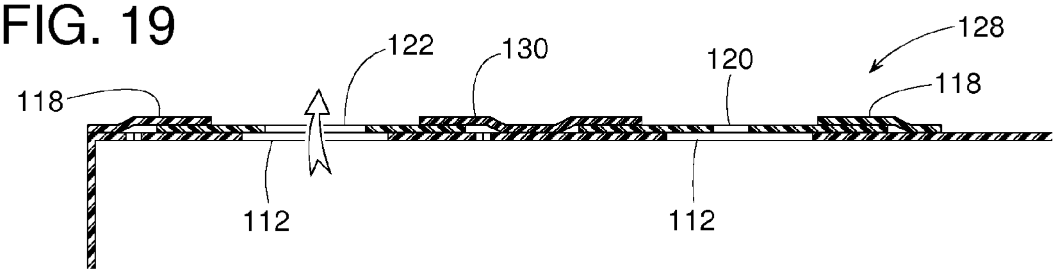
FIG. 19 is a cross-sectional view taken along line 19-19 of FIG. 18.

FIGS. 18 and 19 show an example of how the examples illustrated in FIGS. 15-17 can be expanded to include multiple pliable sheets 116 for adjustably covering multiple discharge openings 112 in a pliable sidewall 126 of a duct 128. The duct 128 may include one or more pliable pieces that are coupled together. In this example, to hold two sheets 116 in position, an intermediate circumferential lip or fastener 130 is installed between lips 118. In some examples, the sheets 116 may additionally be secured relative to the duct 128 with a fastener such as a touch-and-hold fastener.

Figure 20:
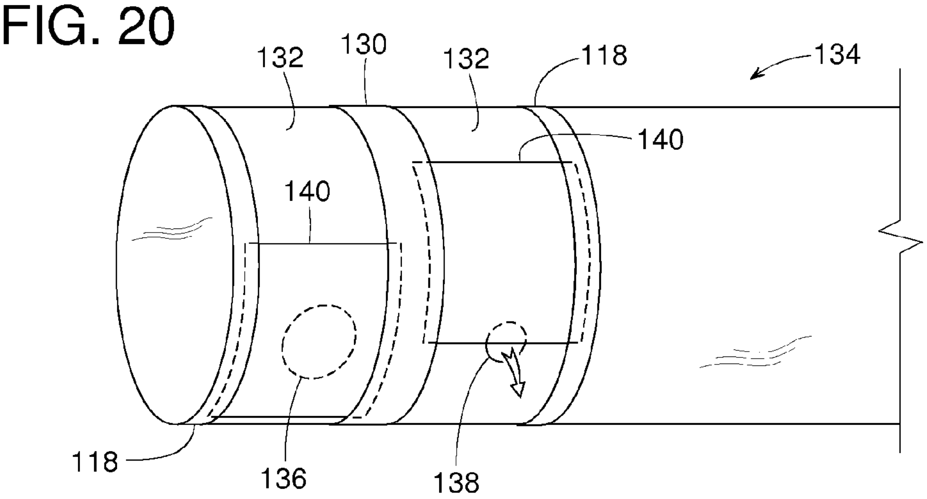
FIG. 20 is a perspective view of another example duct assembly with two circumferentially movable sheets for adjusting the airflow through two discharge openings in the duct.

FIG. 20 is an example similar to that of FIGS. 18 and 19; however, a pliable sidewall 132 of an inflatable duct 134 includes a relatively large discharge opening 136 and a relatively small discharge opening 138. The duct 134 may include one or more pliable pieces that are coupled together. The volume of air flowing through openings 136 and 138 is controlled by adjusting the extent to which pliable sheets 140 cover openings 136 and 138. One sheet 140 is shown completely covering opening 136, and the other sheet 140 only partially covers opening 138.

Figure 21:
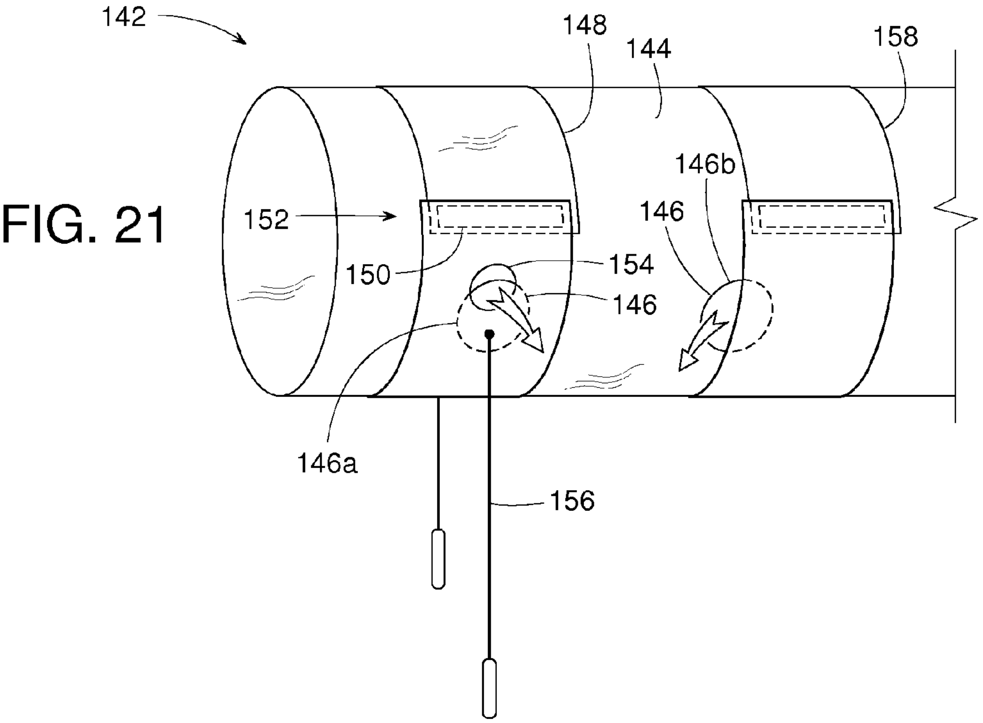
FIG. 21 is a perspective view of another example duct assembly with two movable sheets for adjusting the airflow through two discharge openings in the duct.

An example inflatable air duct 142, shown in FIG. 21, includes a pliable sidewall 144 with one or more discharge openings 146 with airflow therethrough being adjustable by way of a movable pliable sheet in the form of a band that encircles duct 142. A sheet 148, for example, is a band created by a fastener 150 connecting opposite ends 152 of the band together. Examples of fastener 150 include, but are not limited to, a zipper, a touch-and-hold fastener (e.g., VELCRO), a bead-in-groove fastener (e.g., ZIPLOC), a series of hooks, a series of buttons, a series of snaps, laces, etc. The duct 142 may include one or more pliable pieces that are coupled together. Sheet 148, in this example, includes an opening 154 that can be moved in or out of registry with opening 146a by adjustably rotating sheet 148 around or relative to duct 142. In some examples, the sheet 148 may additionally be secured relative to the duct 142 with a fastener such as a touch-and-hold fastener. The openings 146*a* and 154 may be similarly or differently sized. In some examples, an elongate member 156 (e.g., string, cable, chain, strap, cord, rod, etc.) attached to sheet 148 facilitates the positional adjustment of sheet 148.

Additionally or alternatively, a sheet 158 similar to sheet 148 but without opening 154 is used in some examples to control the airflow through opening 146*b* by adjusting the position of sheet 158 along the length of duct 142. FIG. 21, for example, shows sheet 158 partially covering opening 142*b* to restrict the airflow therethrough.

Figure 22:
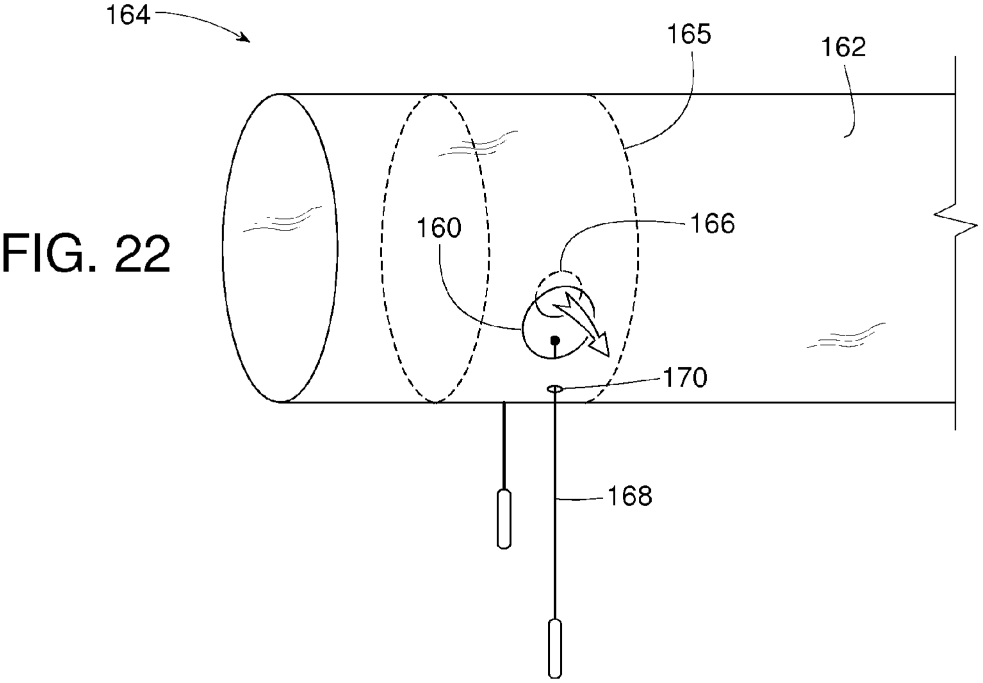
FIG. 22 is a perspective view of an example duct assembly with an internal movable sheet for adjusting the airflow through a discharge opening in the duct.

In some examples, as shown in FIG. 22, airflow through a discharge opening 160 in a pliable sidewall 162 of an inflatable duct 164 is controlled by the position of a band-like sheet 165. The sheet 165 may be installed inside of duct 164, against and/or adjacent to an inner surface of duct 164 (terms "tube" and "duct" being used interchangeably herein). In this example, sheet 165 includes an opening 166 that can be moved in or out of registry with opening 160 by adjustably rotating sheet 165 within duct 164. The openings 160 and 166 may be similarly or differently sized. An elongate member 168 (e.g., string, cable, chain, strap, cord, rod, etc.) threaded or extending through a small hole or aperture 170 in sidewall 162 and connected to sheet 165 can facilitate the circumferential adjustment of sheet 165. The duct 164 may include one or more pliable pieces that are coupled together.

Figure 23:
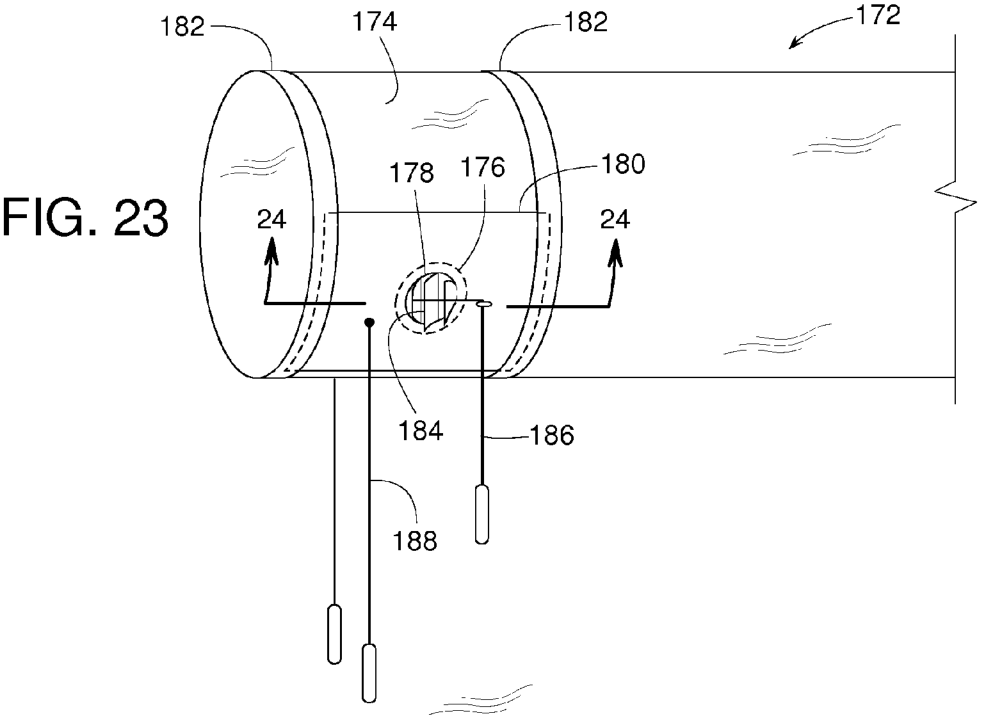
FIG. 23 is a perspective view of an example air duct assembly that includes a movable sheet with example flexible louvers for adjusting the airflow through a discharge opening in the duct.
Figure 24:
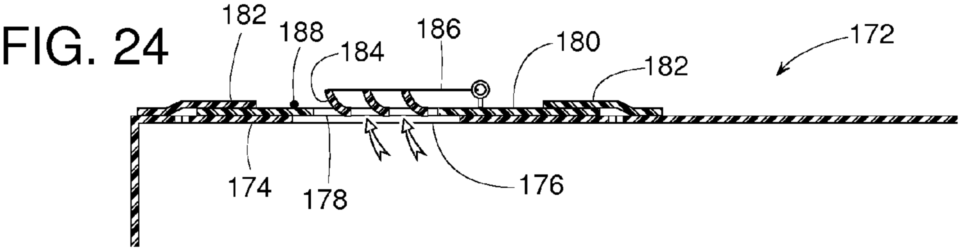
FIG. 24 is a cross-sectional view taken along line 24-24 of FIG. 23.

FIGS. 23 and 24 show an example duct assembly 172 similar to that of FIGS. 15-17 in that a pliable sidewall 174 includes a discharge opening 176 through which airflow is controlled by the degree of registry that opening 176 has with an opening 178 in an overlying and/or adjacent to pliable sheet 180. In this example, duct assembly 172 includes a pair of circumferential lips or fasteners 182 that help hold sheet 180 in a selected position. The adjustable circumferential position of sheet 180 around duct assembly 172 determines the registry of openings 176 and 178.

In the example of FIGS. 23 and 24, one or more flexible flaps 184 (louvers) extend at least partially across opening 178 of sheet 180. In some examples, an elongate member 186 (e.g., string, cable, chain, strap, cord, rod, etc.) coupled to flap 184 serves as an actuator (controlled manually or otherwise) that deflects flap 184 to adjustably direct airflow through opening 178. Additionally or alternatively, while elongate member 186 controls the direction of airflow, another elongate member 188 connected to sheet 180 adjusts the circumferential position of sheet 180 to control the volume of air discharged through openings 176 and 178.

Figure 25:
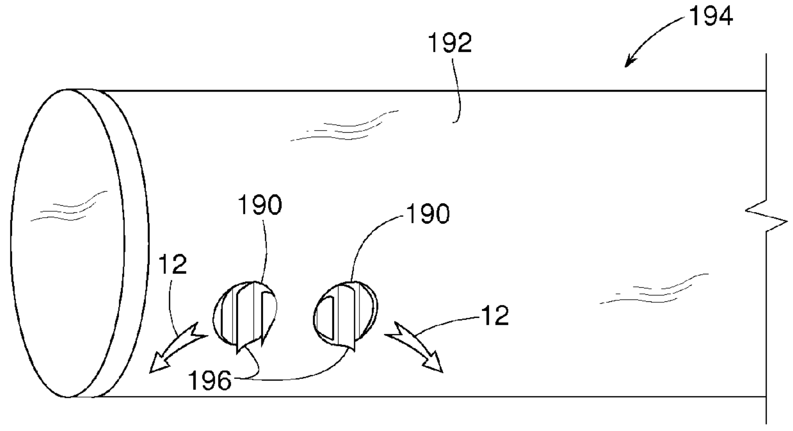
FIG. 25 is a perspective view of an example inflatable air duct with integrally formed discharge louvers.

In some examples, as shown in FIG. 25, louvered discharge openings 190 are cut directly into a pliable sidewall 192 of an example duct 194. In this example, one or more flaps 196 (resiliently flexible louvers) are a seamless integral extension of sidewall 192, and the flexibility of the sidewall material causes flaps 196 to deflect in response to the air pressure within duct 194. Thus, both the direction and volume of discharge air is adjustable by adjusting the air pressure within duct 194. In other examples, one or more flaps 196 may be coupled to sidewall 192 adjacent to opening 190. In such examples, one or more flaps 196 may be coupled adjacent to opening 190 in a manner that controls and/or directs the flow of air through opening 190. Moreover, in some examples, two relatively adjacent discharge openings 190 have flaps 196 that direct air 12 is two different directions, generally away from each other, to more broadly disperse discharge air 12 into the comfort zone.

Figure 26:
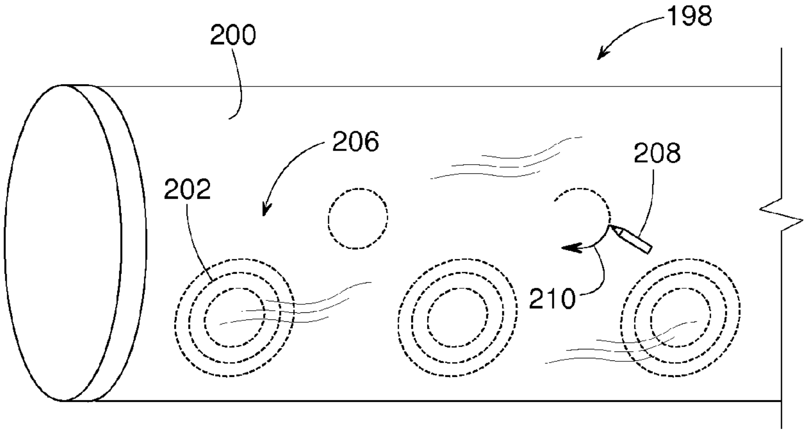
FIG. 26 is a perspective view of an example inflatable air duct with a plurality of example cutout patterns.
Figure 27:
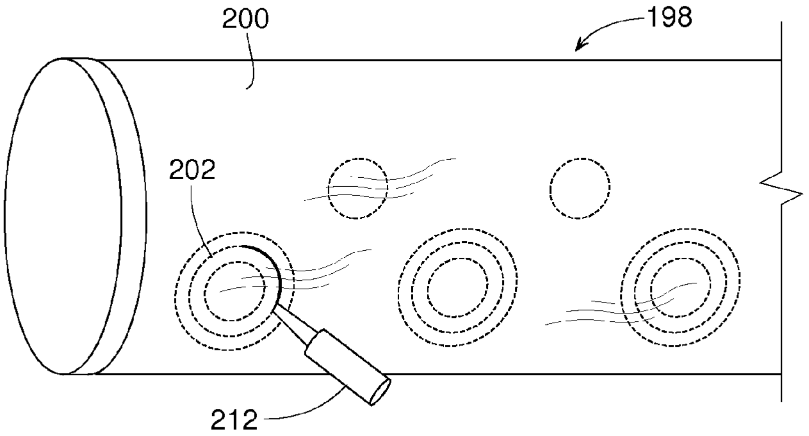
FIG. 27 is a perspective view similar to FIG. 26 but showing the cutout pattern being used as a guide for creating a discharge opening.
Figure 28:
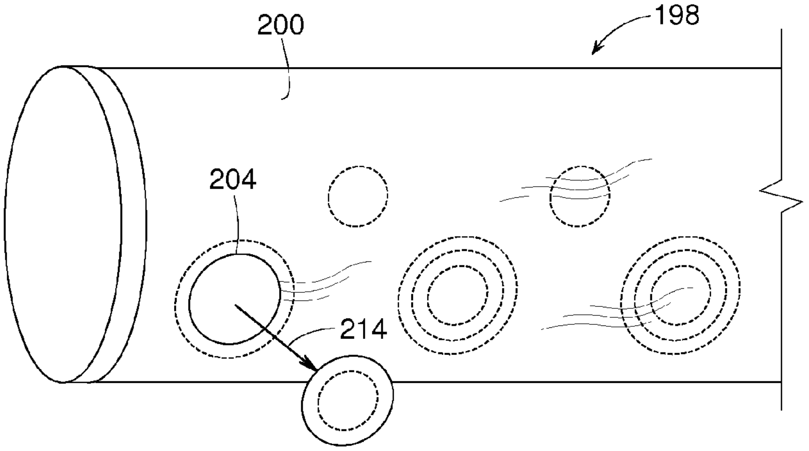
FIG. 28 is a perspective view similar to FIGS. 25 and 26 but showing a cutout being removed to produce the discharge opening.

FIGS. 26-28 illustrate an example inflatable air duct 198 comprising a pliable tubular sidewall 200 with a cutout pattern 202 thereon. The duct 198 may include one or more pieces coupled together. Cutout pattern 202 provides guidance for creating a certain size and shape discharge opening 204 (FIG. 28) through sidewall 200 at a predetermined location. The term, "cutout," as used herein means removable by any means, examples of which include, but are not limited to, cutting, tearing, breaking, etc. Examples of cutout pattern 202 include, but are not limited to, a printed ink image, a perforated line, a laser burned line, etc. Some examples of duct 198 include a plurality of cutout patterns distributed across duct 198. In some examples, a plurality of multiple-size cutout patterns 206 are at the same general location on duct 198. Alternatively, the cutout patterns 206 may be differently arranged along the duct 198. The cutout patterns 206 may be similar or different from one another and may have any suitable shape (e.g., circular, oval, square, etc.) or size, for example.

A marker 208 and an arrow 210 in FIG. 26 illustrate marking a cutout pattern on a pliable tubular sidewall. A knife or tool 212 in FIG. 27 and an arrow 214 in FIG. 28 illustrate creating a discharge opening through the pliable tubular sidewall at the cutout pattern.

In order to facilitate ordering and/or selecting inflatable tube assemblies, a webpage or other user interface may be provided. For example, a webpage provided on the Internet may enable customers to enter design parameters (e.g., building dimensions, ceiling heights, room dimensions, airflow requirements, etc) and receive an indication identifying one or more inflatable air duct designs that meet the design parameters. The customer may then select from among the various potential air duct designs, or change the parameters to get a different set of potential air ducts. Once the customer selects the desired set of air ducts (e.g., by making a selection with a mouse or other user input device), the selected air ducts are identified to the manufacturer who can then process the order by assembling and shipping the desired inflatable air ducts using the inventory of sidewall pieces. Of course, payment information (e.g., credit card information, user identification information such as name and address, etc) may be obtained when accepting the order.

Additionally or alternatively, the above website could be used by a salesperson of the manufacturer, a distributor or other middleman to assist in soliciting, building or otherwise obtaining sales. Also, although the above is described in the context of the Internet, the user interface could be implemented by locally executing software rather than (or addition to) being hosted on the Internet.

Figure 29:
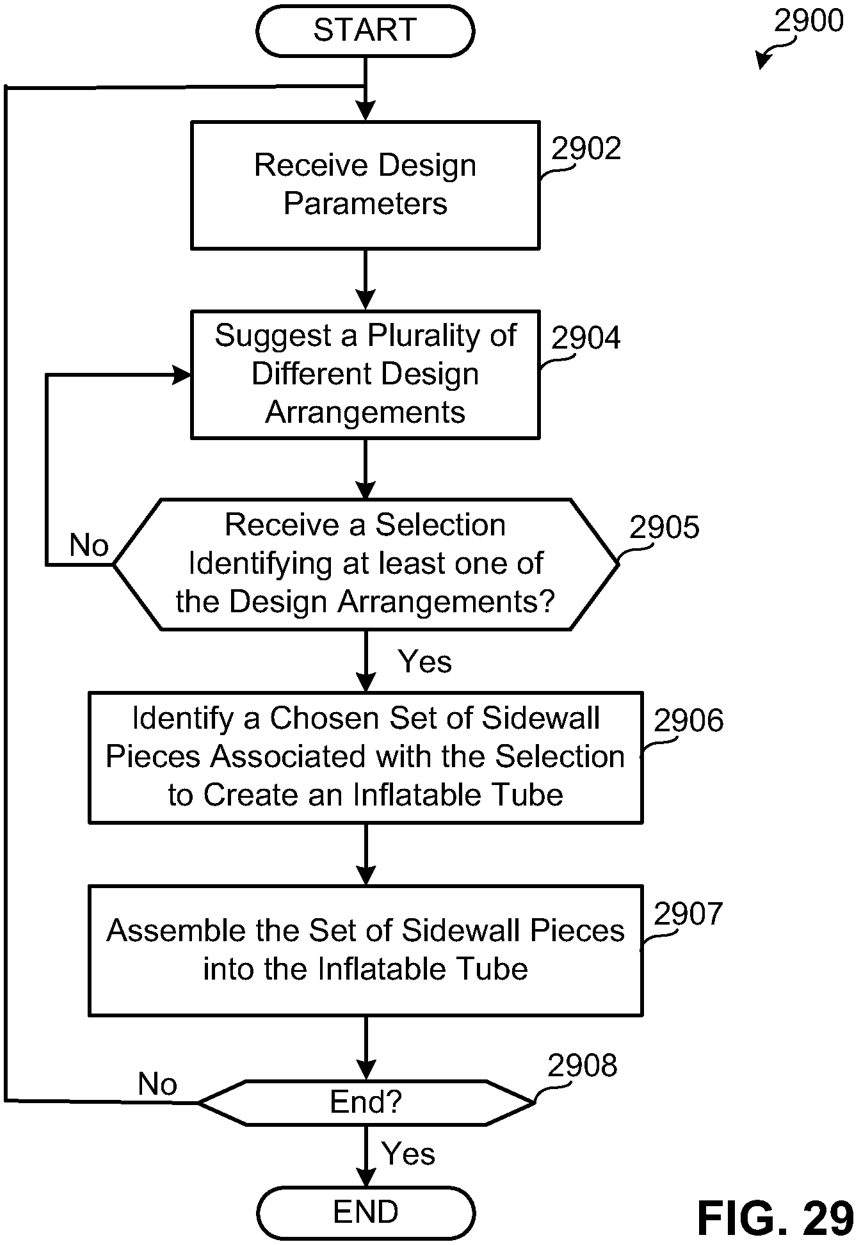
FIG. 29 is a flow diagram representative of example machine readable instructions that may be executed to develop an inflatable air duct assembly.

FIG. 29 is a flow diagram representing example machine readable instructions 2900 that may be executed to identify and/or select inflatable air duct assemblies meeting certain design parameters. The machine readable instructions of FIG. 29 may be executed using a processor, a controller and/or any other suitable processing device. For example, the example instructions of FIG. 29 may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example instructions of FIG. 29 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIG. 29 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIG. 29 may be implemented manually or as any combination(s) of any of the foregoing techniques, for example, any combination of firmware, software, discrete logic and/or hardware. Further, although the example processes of FIG. 29 are described with reference to the flow diagrams of FIG. 29, other methods of implementing the processes of FIG. 29 may be employed. For example, the order of execution of the blocks may be changed, and/or some of the blocks described may be changed, eliminated, sub-divided, or combined. Additionally, any or all of the example processes of FIG. 29 may be performed sequentially and/or in parallel by, for example, separate processing threads, processors, devices, discrete logic, circuits, etc.

Referring to FIG. 29, at block 2902, a user enters design parameters indicative of the environment in which the air ducts are to perform. These parameters may include desired air flows, room dimensions, ceiling heights, etc. Once the parameters are received (block 2902), the instructions identify one or more inflatable air duct designs that meet the design parameters input by the user (block 2904). Preferably, the suggestions are displayed to the user, for example, via a computer display. The suggested air duct design(s) may include a plurality of sidewall pieces that can be interconnected circumferentially to create an assortment of inflatable tubes meeting the air flow requirements for the environment of use specified by the design parameters. The instructions of FIG. 29, then await a user selection of one of the suggested designs or entry of different design parameters (e.g., selection of a start over icon) (block 2905). When a user selects one of the design suggestions (block 2905), the instructions of FIG. 29 identify a set of sidewall pieces required to assemble the inflatable air duct(s) identified by the user selection (block 2906). The identification of the sidewall pieces may then be compiled in a job order or other list and forwarded to a manufacturing site. The identified inflatable air ducts are then assembled at the manufacturing site and/or the pieces are forwarded to the job site for on-site assembly (block 2907). At 2908, the instructions determine whether or not another project is to be processed. If so, control returns to block 2902. If not, the instructions of FIG. 29 terminate.

Figure 30:
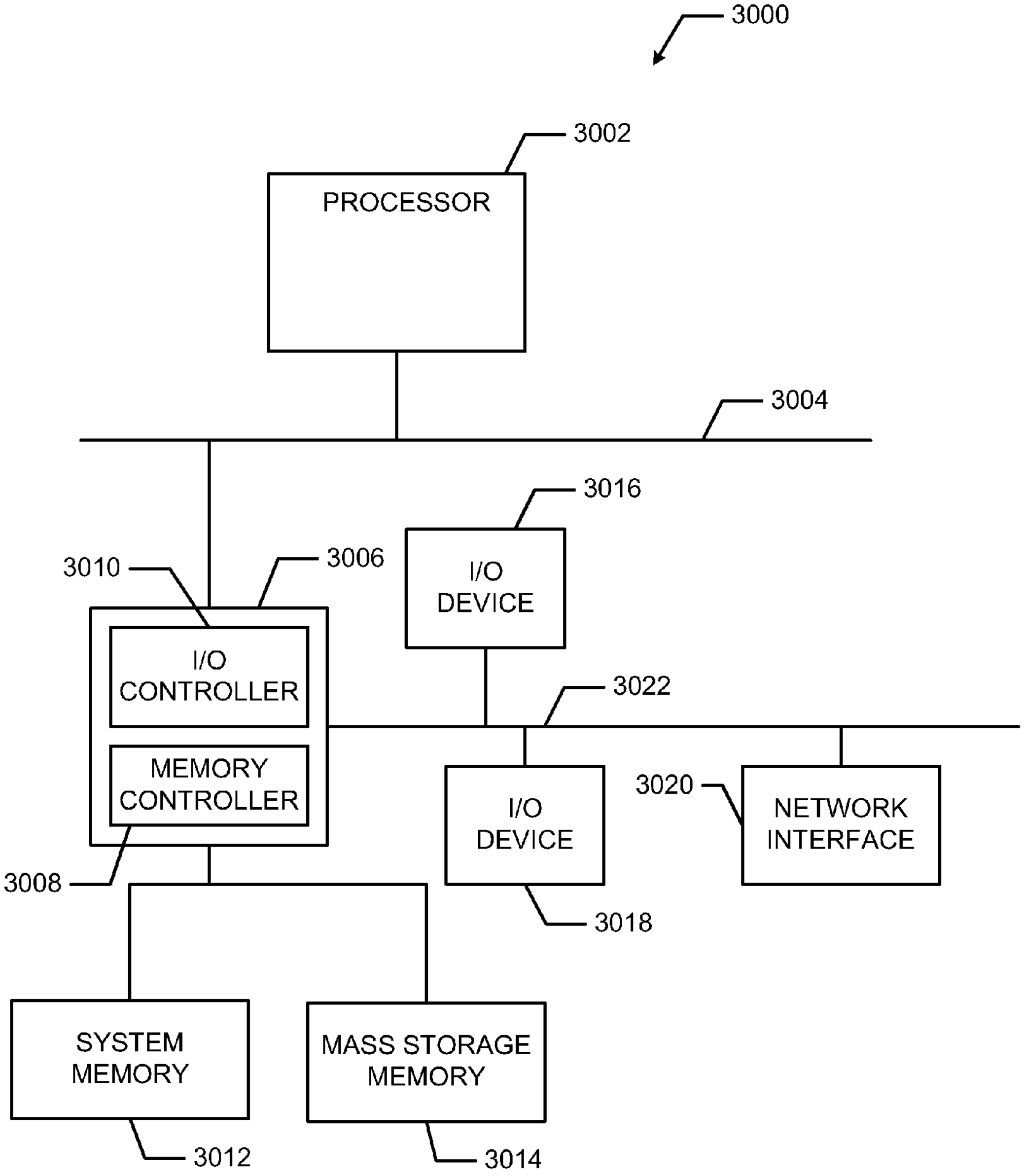
FIG. 30 is a schematic illustration of an example processor platform that may be used and/or programmed to execute the example instructions of FIG. 29 to implement a system to develop inflatable air duct assemblies and/or orders for inflatable air duct assemblies.

FIG. 30 is a block diagram of an example processor system 3000 that may be used to implement the apparatus and methods described herein. As shown in FIG. 30, the processor system 3000 includes a processor 3002 that is coupled to an interconnection bus 3004. The processor 3002 may be any suitable processor, processing unit or microprocessor. Although not shown in FIG. 30, the system 3000 may be a multi-processor system and, thus, may include one or more additional processors that are identical or similar to the processor 3002 and that are communicatively coupled to the interconnection bus 3004.

The processor 3002 of FIG. 30 is coupled to a chipset 3006, which includes a memory controller 3008 and an input/output (I/O) controller 3010. As is well known, a chipset typically provides I/O and memory management functions as well as a plurality of general purpose and/or special purpose registers, timers, etc. that are accessible or used by one or more processors coupled to the chipset 3006. The memory controller 3008 performs functions that enable the processor 3002 (or processors if there are multiple processors) to access a system memory 3012 and a mass storage memory 3014.

The system memory 3012 may include any desired type of volatile and/or non-volatile memory such as, for example, static random access memory (SRAM), dynamic random access memory (DRAM), flash memory, read-only memory (ROM), etc. The mass storage memory 3014 may include any desired type of mass storage device including hard disk drives, optical drives, tape storage devices, etc.

The I/O controller 3010 performs functions that enable the processor 3002 to communicate with peripheral input/output (I/O) devices 3016 and 3018 and a network interface 3020 via an I/O bus 3022. The I/O devices 3016 and 3018 may be any desired type of I/O device such as, for example, a keyboard, a video display or monitor, a mouse, etc. The network interface 3020 may be, for example, an Ethernet device, an asynchronous transfer mode (ATM) device, an 802.11 device, a DSL modem, a cable modem, a cellular modem, etc. that enables the processor system 3000 to communicate with another processor system.

While the memory controller 3008 and the I/O controller 3010 are depicted in FIG. 30 as separate blocks within the chipset 3006, the functions performed by these blocks may be integrated within a single semiconductor circuit or may be implemented using two or more separate integrated circuits.

Some of the aforementioned examples may include one or more features and/or benefits including, but not limited to, the following:

In some examples, inflatable ducts of various diameters and lengths can be created by selectively assembling pre-existing stock pieces in different combinations.

In some examples, an elbow is attachable in different orientations to an inflatable tube to direct airflow in alternate directions.

In some examples, a pliable sheet provides a flexible register that can deflect with the inflation and deflation of an inflatable tube.

In some examples, a flexible sheet register in the form of a band that encircles an inflatable tube such that when the tube is inflated, the radially expanded tube helps hold the band in position.

In some examples, a pliable inflatable tube includes integral flaps or louvers that deflect open in response to air pressure within the tube.

In some examples, a pliable inflatable air duct includes one or more cutout patterns that provide guidance in creating a discharge opening of the proper size and location.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

What is claimed is:

1. An inflatable air duct assembly for conveying air in a longitudinal direction, the inflatable air duct assembly comprising:
- a first sidewall piece that is pliable;
- a first zipper side along a first longitudinal edge of the first sidewall piece, the first zipper side to selectively zip with either a second zipper side along a second longitudinal edge of the first sidewall piece or a third zipper side along a longitudinal edge of a second sidewall piece to provide a first tube segment selectively configurable in at least one of a first configuration having a first diameter when the first zipper side is zipped with the second zipper side or a second configuration having a second diameter larger than the first diameter when the first zipper side is zipped with the third zipper side, the first longitudinal edge of the first sidewall piece to extend in the longitudinal direction;
- a second tube segment that is pliable; and
- a disconnectable circumferential joint connecting the first and second tube segments end-to-end.

2. The inflatable air duct assembly of claim 1, wherein the first sidewall piece is larger circumferentially than the second sidewall piece.

3. The inflatable air duct assembly of claim 1, wherein the second zipper side is zipped with a fourth zipper side when in the second configuration, the fourth zipper side extending along a second longitudinal edge of the second sidewall piece.

4. The inflatable air duct assembly of claim 1, wherein the second zipper side is zipped with a fourth zipper side when in the second configuration, the fourth zipper side extending along a longitudinal edge of a third sidewall piece.

5. The inflatable air duct assembly of claim 1, wherein the disconnectable circumferential joint includes a fourth zipper side on an axial edge of the first sidewall piece and a fifth zipper side on an axial edge of the second tube segment, the fourth and fifth zipper sides to be zipped together.

6. The inflatable air duct assembly of claim 5, wherein the disconnectable circumferential joint includes a sixth zipper side on an axial edge of the second sidewall piece and a seventh zipper side on an axial edge of the second tube segment, the sixth and seventh zipper sides to be zipped together.

7. An inflatable air duct assembly method, comprising:
- suggesting, via a processor, a plurality of different design arrangements in which at least two of a plurality of sidewall pieces are to be interconnected to create one inflatable tube of an assortment of inflatable tubes, each of the at least two of the plurality of sidewall pieces to be connected via adjacent longitudinal edges of the sidewall pieces extending in a longitudinal direction of the two of the plurality of sidewall pieces to define a distinct circumferential portion for the one inflatable tube, the plurality of sidewall pieces being pliable and including a common sidewall piece, the plurality of different design arrangements includes a first tube design that has a first diameter and employs the common sidewall piece, and the plurality of different design arrangements includes a second tube design that has a second diameter smaller than the first diameter and employs the common sidewall piece, wherein a difference in the first diameter of the first tube design and the second diameter of the second tube design is such that the first tube design requires a first end cap with a different size than a second end cap fitted to the second tube design;
- selecting a chosen set of sidewall pieces from the plurality of sidewall pieces based on one of the plurality of different design arrangements; and
- interconnecting the chosen set of sidewall pieces by the adjacent longitudinal edges to create an inflatable air duct according to the one of the plurality of different design arrangements.

8. The inflatable air duct assembly method of claim 7, wherein the plurality of sidewall pieces vary in circumferential length.

9. The inflatable air duct assembly method of claim 7, wherein the common sidewall piece of the inflatable air duct comprises detachable longitudinal joints interconnecting the chosen set of sidewall pieces.

10. An inflatable air duct assembly for conveying air in a longitudinal direction and being selectively configurable in at least one of a first configuration corresponding to a first diameter or a second configuration corresponding to a second diameter larger than the first diameter, the inflatable air duct assembly comprising:
- a first sidewall section that is pliable, the first sidewall section including a first longitudinal edge and a second longitudinal edge;
- a first zipper along the first longitudinal edge;
- a second zipper along the second longitudinal edge, the first and second zippers are zipped together when the inflatable air duct assembly is in the first configuration corresponding to the first diameter;
- a second sidewall section that is pliable;
- a third zipper along a first longitudinal edge of the second sidewall; and
- a fourth zipper along a second longitudinal edge of the second sidewall section, at least one of the third or fourth zippers to be in zipped engagement with the first zipper when the inflatable air duct assembly is in the second configuration corresponding to the second diameter.

11. An inflatable air duct assembly being selectively configurable in at least one of a first direction configuration to direct air in a first direction or a second direction configuration to convey the air in a second direction, the inflatable air duct assembly comprising:
- a tube that is pliable;
- an elbow that is pliable;
- a first side of a first zipper extending circumferentially along a first portion of an end of the tube;
- a first side of a second zipper separate from the first zipper, the first side of the second zipper extending circumferentially along a second portion of the end of the tube, the first portion of the end of the tube different than the second portion of the end of the tube;
- a second side of the first zipper extending circumferentially along a first portion of an end of the elbow; and
- a second side of the second zipper extending circumferentially along a second portion of the end of the elbow, the first portion of the end of the elbow different than the second portion of the end of the elbow, the inflatable air duct assembly being in the first direction configuration to direct the air in the first direction when the first side of the first zipper and the first side of the second zipper are respectively zipped with the second side of the first zipper and the second side of the second zipper, and the inflatable air duct assembly being in the second direction configuration to direct the air in the second direction when the first side of the first zipper and the first side of the second zipper are respectively zipped with the second side of the second zipper and the second side of the first zipper.

12. The inflatable air duct assembly of claim 11, wherein the tube includes a longitudinal joint positioned circumferentially between the two first and second zippers.

13. The inflatable air duct assembly of claim 11, wherein the first direction and the second direction point substantially 180 degrees away from each other.

14. The inflatable air duct assembly of claim 11, wherein first side of the first zipper and the first side of the second zipper are to be of substantially equal circumferential length about the end of the tube.

15. A method for creating an inflatable air duct assembly comprising:

executing machine readable instructions stored on a tangible article of manufacture to cause a machine to:

suggest a plurality of inflatable air duct assembly designs each including a common sidewall piece and at least one of a plurality of other sidewall pieces, the common sidewall piece and the at least one other sidewall pieces to be releasably interconnected to create an inflatable tube, each of the common sidewall piece and the at least one other sidewall piece of the inflatable tube corresponding to each of the assembly designs to be connected via adjacent longitudinal edges of the common sidewall piece and the at least one other sidewall piece extending in a longitudinal direction of the inflatable tube corresponding to each of the assembly designs to define a distinct circumferential portion of the inflatable tube, the at least one other sidewall piece corresponding to a first sidewall piece in a first one of the assembly designs, the at least one other sidewall piece corresponding to a second sidewall piece in a second one of the assembly designs, the first sidewall piece and the common sidewall piece of the first one of the assembly designs together circumscribing a first tube having a first diameter, the second sidewall piece and the common sidewall piece of the second one of the assembly designs together circumscribing a second tube having a second diameter smaller than the first diameter, wherein a difference in the first diameter of the first tube and the second diameter of the second tube is such that the first tube requires a first end cap with a different diameter than a second end cap fitted to the second tube;

respond to a user selection to identify a set of sidewall pieces from a plurality of sidewall pieces to create the inflatable air duct assembly; and interconnecting the identified set of sidewall pieces by the respective adjacent longitudinal edges to create the inflatable air duct assembly.

* * * * *

UNITED STATES PATENT AND TRADEMARK OFFICE

CERTIFICATE OF CORRECTION

PATENT NO. : 9,494,336 B2
APPLICATION NO. : 12/772863
DATED : November 15, 2016
INVENTOR(S) : Pinkalla et al.

It is certified that error appears in the above-identified patent and that said Letters Patent is hereby corrected as shown below:

In the Claims

Column 13, Line 5 (Claim 12): Replace “the two first and” with --the first and--.

Signed and Sealed this
Seventh Day of March, 2017

Michelle K. Lee
*Director of the United States Patent and Trademark Office*